(12) United States Patent
Lu et al.

(10) Patent No.: US 7,826,502 B2
(45) Date of Patent: Nov. 2, 2010

(54) CIRCUIT AND METHOD FOR LESSENING NOISE IN A LASER SYSTEM HAVING A FREQUENCY CONVERTING ELEMENT

(75) Inventors: Haiping Lu, Petaluma, CA (US); Vincent Issier, Windsor, CA (US); David Simons, Santa Rosa, CA (US); Andy Miller, Windsor, CA (US)

(73) Assignee: JDS Uniphase Corporation, Milpitas, CA (US)

( * ) Notice: Subject to any disclaimer, the term of this patent is extended or adjusted under 35 U.S.C. 154(b) by 188 days.

(21) Appl. No.: 11/950,869

(22) Filed: Dec. 5, 2007

(65) Prior Publication Data

US 2008/0144678 A1    Jun. 19, 2008

Related U.S. Application Data

(60) Provisional application No. 60/869,978, filed on Dec. 14, 2006.

(51) Int. Cl.
   *H01S 3/10* (2006.01)
(52) U.S. Cl. .............................. 372/22; 372/21; 372/36; 372/29.02; 372/29.021; 372/31
(58) Field of Classification Search .................. 372/22, 372/21, 36, 34, 29.02, 29.021, 31
   See application file for complete search history.

(56) References Cited

U.S. PATENT DOCUMENTS 4,933,947 A * 6/1990 Anthon et al. ................. 372/34

| | | | |
|---|---|---|---|
| 5,384,797 A | 1/1995 | Welch et al. | 372/23 |
| 5,644,584 A | 7/1997 | Nam et al. | 372/20 |
| 6,332,721 B1 | 12/2001 | Inokuchi | 385/93 |
| 6,370,168 B1 | 4/2002 | Spinelli | 372/22 |
| 6,393,038 B1 | 5/2002 | Raymond et al. | 372/22 |
| 6,400,746 B1 | 6/2002 | Yang | 372/102 |
| 6,438,153 B1 | 8/2002 | Caprara et al. | 372/92 |
| 6,480,657 B1 | 11/2002 | Dai | 385/123 |
| 7,177,340 B2 | 2/2007 | Lang et al. | 372/102 |
| 7,242,700 B2* | 7/2007 | Wang | 372/22 |
| 7,386,021 B2* | 6/2008 | Kashyap | 372/34 |
| 2004/0165639 A1 | 8/2004 | Lang et al. | 372/92 |

FOREIGN PATENT DOCUMENTS

DE    19646073    4/1998
EP    0398570    11/1990

OTHER PUBLICATIONS

"Noise characteristics of a frequency-doubled Nd:YAG laser with intracavity type II phase-matched KTP" by Chee et al. Optics Communications, North-Holland Publishing Co., Amsterdam, NL, vol. 118, No. 3, Jul. 15, 1995. pp. 289-296.

* cited by examiner

*Primary Examiner*—Minsun Harvey
*Assistant Examiner*—Kinam Park
(74) *Attorney, Agent, or Firm*—Matthew A. Pequignot; Pequignot + Myers LLC

(57) ABSTRACT

A method and circuit is disclosed for a laser system wherein the power of the laser signal is kept at a constant near optimum value and a portion of an frequency doubled output signal is monitored and detected so that noise within the frequency doubled output signal can be minimized. A feedback signal is used to dither the temperature of a frequency doubled crystal so as to minimize the noise in the frequency doubled output signal.

17 Claims, 7 Drawing Sheets

CIRCUIT AND METHOD FOR LESSENING NOISE IN A LASER SYSTEM HAVING A FREQUENCY CONVERTING ELEMENT

CROSS-REFERENCE TO RELATED APPLICATIONS

This Application claims priority of U.S. Provisional Patent Application No. 60/869,978 filed Dec. 14, 2006, which is incorporated herein by reference for all purposes.

FIELD OF THE INVENTION

The present invention relates in general to the stabilization of the output of a laser system and more particularly to lessening noise in the output of a diode-laser pumped, solid-state, externally frequency-converted laser system.

BACKGROUND OF THE INVENTION

There is considerable demand for short-wavelength laser sources such as green, blue and UV lasers. One known approach to create such a light source is to utilize red or infra-red laser diodes, which are widely available in a variety of configurations. These diodes, in combination with nonlinear elements made of optically nonlinear materials, can produce short-wavelength frequency-doubled radiation by means of second harmonic generation (SHG) in the nonlinear element.

A laser source for frequency doubling requires (a) high power, (b) stable, narrow-line operation, (c) simple, low-cost optics and assembly, and, importantly (d) some means of fine-tuning the spectrum to match it to a doubling material to optimize efficiency. This invention particularly relates to a method and circuit to minimize noise in the frequency doubled output signal.

A number of prior art designs for frequency doubling of laser diode emission have been disclosed. For example, U.S. Pat. No. 5,384,797, in the names of Welch et al., describes a monolithic multi-wavelength laser diode array having output light that can be coupled into a ferroelectric frequency doubler integrally formed on an array substrate. U.S. Pat. No. 5,644,584, in the names of Nam et al. describes a tunable blue laser diode having a distributed Bragg reflector (DBR) or distributed feedback (DFB) tunable diode laser coupled to a quasi-phase-matched waveguide of optically nonlinear material. U.S. Pat. No. 6,370,168 to Spinelli describes an intracavity frequency-converted optically-pumped semiconductor laser based on surface-emitting gain-structure surmounting a Bragg mirror, and an external concaved mirror. U.S. Pat. No. 6,393,038 to Raymond et al. describes a frequency-doubled vertical-external-cavity surface-emitting laser; and, U.S. Pat. No. 6,438,153 to Caprara et al. describes an intracavity-converted optically-pumped semiconductor laser. Although these aforementioned inventions appear to perform their intended function, many provide solutions wherein power and frequency stabilization requirements are met through the use of complex laser structures or complex nonlinear element arrangements. Furthermore, since complex laser designs usually lead to somewhat reduced power and increase in noise, these prior art solutions either use an intra-cavity nonlinear doubling arrangement to benefit from the intra-cavity resonance power enhancement, at the expense of yet more complex cavity control, or use single-pass doubling with relatively low output powers. U.S. Pat. No. 7,242,700 to Wang discloses a circuit for stabilizing a laser frequency doubled output signal. Although this circuit to some degree achieves its goal, a more reliable solution having less noise in the output laser frequency doubled signal is being sought after.

In an attempt to overcome some of the limitations of the prior art, U.S. Pat. No. 7,177,340 to Lang et al. assigned to JDS Uniphase Corporation describes an extended cavity laser device with bulk transmission grating. The system of Lang et al. uses a semi-conductor, high power, lasers of simple cavity design, such as edge emitting 980 nm laser diodes commonly used to pump erbium-doped fiber amplifiers, in an external cavity arrangement with frequency stabilization provided by an external frequency selective reflector. This patent attempts to provide a simple Littrow-type external cavity configuration for a diode laser, which substantially maximizes output power and enables frequency tuning without angular tuning of the output beam. An interesting aspect of U.S. Pat. No. 7,177,340 is that spectral noise of the laser diode radiation is substantially mitigated by providing an additional electric dither current to the laser diode to cause frequency modulation of the laser diode radiation with amplitude exceeding mode spacing. Such dithering results in a continuous scrambling of the laser light to increase stability of time-averaged spectrum of the laser diode radiation and therefore to stabilize a time-averaged power of the frequency-doubled radiation.

SHG is routinely used to double the frequency and halve the wavelength of near-IR fundamental radiation having a wavelength near 1000 nanometers (nm) to produce visible light having a wavelength near 500 nm. In this context, SHG commonly involves propagating an IR output beam from a diode-pumped solid-state (DPSS) laser resonator through an appropriate optically nonlinear crystal, for example a crystal of lithium triborate (LBO). When such a crystal is properly tuned by establishing an appropriate orientation and temperature, visible light is generated and exits the crystal, usually accompanied by some residual fundamental-wavelength light. The efficiency of converting power from the fundamental wavelength to the desired frequency-converted wavelength (conversion efficiency) is defined by the ratio of the net power transferred to the frequency-converted output divided by the power contained in the fundamental-wavelength source beam. IR-to-visible conversion efficiencies exceeding 50% in LBO are readily demonstrated.

As noted above, optimization of a frequency converter generally involves establishing an appropriate wavelength-dependent crystal orientation and operating temperature. Operating parameters that optimize conversion efficiency for a particular frequency converter may be determined during a preliminary characterization or calibration phase of system operation. Optimal operating parameters might be determined once and thereafter be left unchanged in anticipation of retaining the demonstrated performance without subsequent intervention by a system operator.

However, such an optimistic approach typically encounters problems. Over time, the frequency-converted output power of a DPSS laser, even given constant input power, tends to degrade as optical components age and accumulate damage. In addition, as the laser system power level or operating duty factor change, re-tuning of the frequency converter often becomes necessary and some method of monitoring conversion efficiency becomes advisable.

One method to compensate for deteriorating frequency-converted output power involves monitoring the frequency-converted output power level and increasing pump power as needed to boost the output while also monitoring the fundamental power level to allow determination of the conversion efficiency. Adjustments may then be made to the frequency converter to maintain or recover the desired efficiency. This approach does not always give satisfactory results.

The time-averaged power and perhaps even the position of the frequency-converted output may change so much over time that no reasonable adjustment of the diode drive current alone can recover the desired operating condition. Further, when fundamental and frequency-converted beams are sampled and detected separately, components exposed to the different beams may degrade at different rates. Such differential aging may bias the assessment of conversion efficiency. In addition, verifying that peak conversion efficiency is being maintained, when the output power may be slowly varying due to changes in the laser resonator, necessitates detuning the frequency converter away from an optimal condition, checking for a corresponding roll-off in performance, then re-tuning back to the optimal value.

In many instances, it is desirous to provide a frequency doubling laser circuit that maximizes output power regardless of the noise generated. However in other particular instances, where output power is of less of a concern, it is desired to minimize the noise present in the frequency doubled signal. Although maximizing output power and lessening noise typically occur to some degree together, they most often do not track perfectly with one another. For example achieving the lowest possible noise in the output signal does not ensure that maximum power will be attained. Furthermore, achieving maximum power output from the frequency doubling crystal does not ensure that the lowest noise will be achieved.

This invention is primarily concerned with the lessening of noise in the frequency doubled output signal and provides a novel way in which to achieve this as the laser and frequency doubling crystal physically change by aging over time.

It is an object of this invention to provide a method and circuit for frequency converting an optical signal to a shorter wavelength while minimizing noise in the output signal.

It is an object of this invention to continuously dither the temperature of a frequency doubling crystal and search for an optimized crystal temperature by varying the temperature in predetermined steps based on input from an RMS noise detector and current monitor.

It is an object of the invention to optimize the crystal temperature to minimize noise as the laser ages, as current driving the laser changes, as ambient temperature changes, and as stress and release of stress occurs within the crystal.

SUMMARY OF THE INVENTION

The present invention is directed to providing a low noise frequency-converted laser signal. In a general aspect, the inventive laser system comprises a current driven laser diode to generate and deliver a beam of fundamental radiation having a first (fundamental) wavelength. The laser system includes a frequency converting crystal located separate from the laser and aligned to receive light from the laser. The frequency converting crystal converts a portion of the fundamental-wavelength beam to a frequency-converted beam. One or more detectors are provided for monitoring the noise present on the frequency-converted beam. A controller is arranged cooperative with the detectors to adjust the temperature of the frequency converting crystal by repeatedly dithering the temperature while monitoring the noise so as to lessen it. The position of the frequency-converted beam and the conversion efficiency of the frequency converter are to some degree dependent on the temperature of the optically nonlinear crystal.

In accordance with the invention, there is provided a method of controlling the output signal generated by a frequency converting crystal comprising the steps of:

providing a frequency converting crystal with light of a first wavelength at an input end thereof;

detecting a portion of frequency converted light exiting an output end of the frequency converting crystal and converting the portion of frequency converted light to an electrical signal;

determining from the electrical signal, a level of noise present in the detected portion of the frequency converted light; and repeatedly varying the temperature of the frequency converting crystal upward and downward within limits in increments, while continuing to perform steps (b) and (c) so as to minimize the RMS noise present in the frequency converted light.

A circuit for generating a low noise short wavelength signal comprising:

a laser for providing a first optical signal having a first wavelength;

a frequency converting element positioned to receive the first optical signal from the laser and for converting the first optical signal into a second optical signal having a shorter wavelength than the first wavelength;

a detector for detecting a portion of the second optical signal and for providing a first electrical signal having characteristics dependent upon the second optical signal;

a first control circuit responsive to the first electrical signal and for determining an optical power value and a noise value corresponding to power and noise present in the second optical signal in dependence upon characteristics of the first electrical signal;

a second control responsive to input from the first control circuit in communication with the laser for maintaining the power of the laser at a constant value;

a third control circuit responsive to input from the first control circuit for varying the temperature in a continuous manner so as to lessen noise present in the second optical signal.

In accordance with the invention there is provided a circuit for generating a low noise short wavelength optical signal comprising:

a laser for providing a first optical signal having a first wavelength longer than the short wavelength signal;

a frequency converting element positioned to receive the first optical signal from the laser and for converting the first optical signal into the short wavelength signal;

a feedback circuit for detecting a portion of the second optical signal and for adjusting the temperature of the frequency converting element upward one or more temperature increments and downward one or more temperature increments continuously so as to lessen noise present in the short wavelength signal, wherein said increases upward and downward in temperature are based on an amount of detected noise in the short wavelength signal; and, a control circuit for maintaining the power level of the short wavelength signal to be at a constant value while the feedback circuit lessens noise present in the short wavelength signal.

BRIEF DESCRIPTION OF THE DRAWINGS

The accompanying drawings, which are incorporated in and constitute a part of the specification, schematically illustrate a preferred embodiment of the present invention and together with the general description given above and the detailed description of the preferred embodiment given below, serve to explain the principles of the present invention.

DETAILED DESCRIPTION

Figure 1:
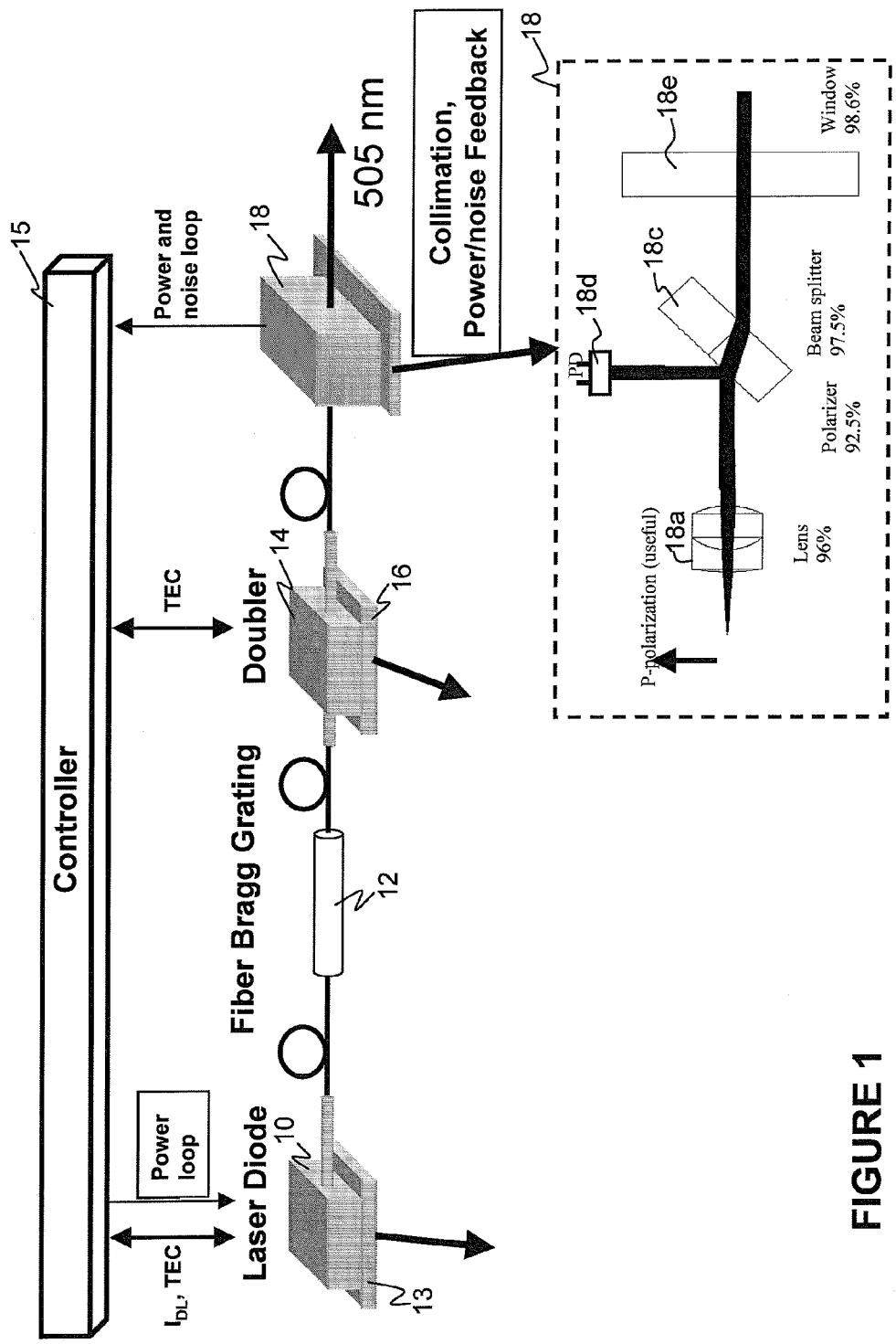
FIG. 1 is a circuit diagram of a frequency doubling laser system in accordance with this invention wherein two feedback circuits are provided.

Turning now to FIG. 1 a laser system for frequency doubling a laser generated signal having a predetermined wavelength $\lambda_L$ is provided wherein the wavelength of the output frequency doubled converted signal is $\lambda/2$. Although specific examples described hereafter refer to a frequency doubling system utilizing a passive waveguide frequency doubling crystal, other frequency converting elements and devices may be utilized.

In FIG. 1 a laser diode 10 is shown having controls signals provided by a controller 15 for controlling a thermoelectric cooler (TEC) 13 for maintaining the laser diode at a controllable operating temperature and constant power. Current $I_{DL}$ is varied so as to ensure the power in the laser diode is maintained at a constant value as the temperature of the circuit changes and as the laser ages. A fiber Bragg grating 12 is positioned along a path within an optical fiber optically coupling the laser diode 10 output signal to an input of a frequency doubling crystal 14, for maintaining a narrow line width output signal from the laser diode 10. The frequency doubling crystal 14 sensitive to temperature variations, rests upon a TEC 16 that is controlled by the controller 15 for varying or dithering the temperature of the crystal 14 so as to minimize noise. A power noise detector and feedback circuit 18 taps a portion of the output signal from the frequency doubling crystal so as to sample the portion of the output signal and provides an electrical signal representative of the power level and noise level to the controller 15 so that the noise can be minimized by adjusting the temperature of the TEC 16 while maintaining the output power to a constant value by adjusting $I_{DL}$. The feedback circuit 18 is shown in the lower portion of the figure as an expanded detailed view of 18 which includes a lens 18a, for substantially collimating light; a beam splitter 18c which provides 2.5% of the polarized beam to a photodetector 18d and which passes the remaining portion of light through a window 18e.

The circuit shown in FIG. 1 generally operates as follows. In order to lessen noise in the output signal of the frequency doubling crystal 14 which is a particular goal of this invention, the temperature of the frequency doubling crystal is dithered so as to be purposefully varied upward one or more increments, and subsequently downward one or more increments, continuously, within a predetermined range of temperatures about a set point or starting point selected as a preset start value. For example a starting value is selected which is statistically determined to be within a suitable operating range of about which relatively low noise results. When the laser is switched on, the automated startup procedure residing in processor controlled firmware, described hereafter in a state diagram, causes the temperature to be scanned around this starting value, in a range of ±2° C. and RMS noise is measured during this scan as a function of temperature to find a temperature where the noise it at a minimum.

The RMS noise detector only provides a relative noise figure; the laser 10 is in constant power mode and there is no requirement to determine the actual noise value.

By performing this start-up routine, the suitably programmed processor determines the operating temperature with the least noise and this becomes the starting point for the program for further operation in noise optimization mode. This is performed in constant power mode so that the power of the output signal is maintained at a fixed value.

Since the optimal waveguide temperature does not vary significantly during the operation of the frequency doubling laser system, the preset scanning range can capture the noise minimum. Although not critical in many implementations, it is fortunate that the optimum noise condition, that is, the low noise condition is not far from the maximum laser power output; therefore it is not difficult to find this point during initial waveguide characterization. This temperature point is used to determine the initial temperature window.

In operation when the temperature is dithered upward in one or more temperature increments and downward in one or more temperature increments, repeatedly to maintain the low noise condition, an increment or step size is selected that is larger than the variation in the noise present. The step size should be larger than the statistical temperature independent variation of noise; however the temperature variation should be small enough so as to not induce noise. For the current device it was found experimentally that a step size of 0.02° C.-0.03° C. is optimal.

The power control loop within the circuit for controlling the laser diode 10 output power is operated independently from the temperature control loop which controls the frequency doubling crystal 14. Ideally, the power control loop controls the pump laser current and maintains the output power at a constant value. When waveguide temperature changes, it affects the conversion efficiency and power control loop reacts on waveguide temperature variations as well. If waveguide temperature varies too far from the optimum for the frequency conversion, current may reach a limit which would result in a power decrease. However, the noise minimum is not far from the power maximum, therefore, the requirements for waveguide temperature optimization to reach maximum conversion efficiency or minimum noise are not contradictory; they simply do not exactly coincide. Therefore in this system a very small sacrifice is made in efficiency so as to achieve noise optimization.

There is a firmware based on a proportional, integral and derivative (PID) loop to maintain the desired waveguide package temperature. The control loop includes a built-in thermistor in the package, a thermoelectric cooler (TEC), circuitry for driving the TEC and micro-control unit or processor. Based on the temperature reading from the thermistor, the PID controller calculates the driving current based on the temperature error between setpoint and reading. This calculated current is then used to drive the TEC to maintain the temperature setpoint. The PID parameters are determined such that the servo loop is stable and has a fast response to any thermal disturbance and setpoint change.

The waveguide temperature optimization (WTO) algorithm determines the temperature setpoint for the waveguide package.

Figure 2:
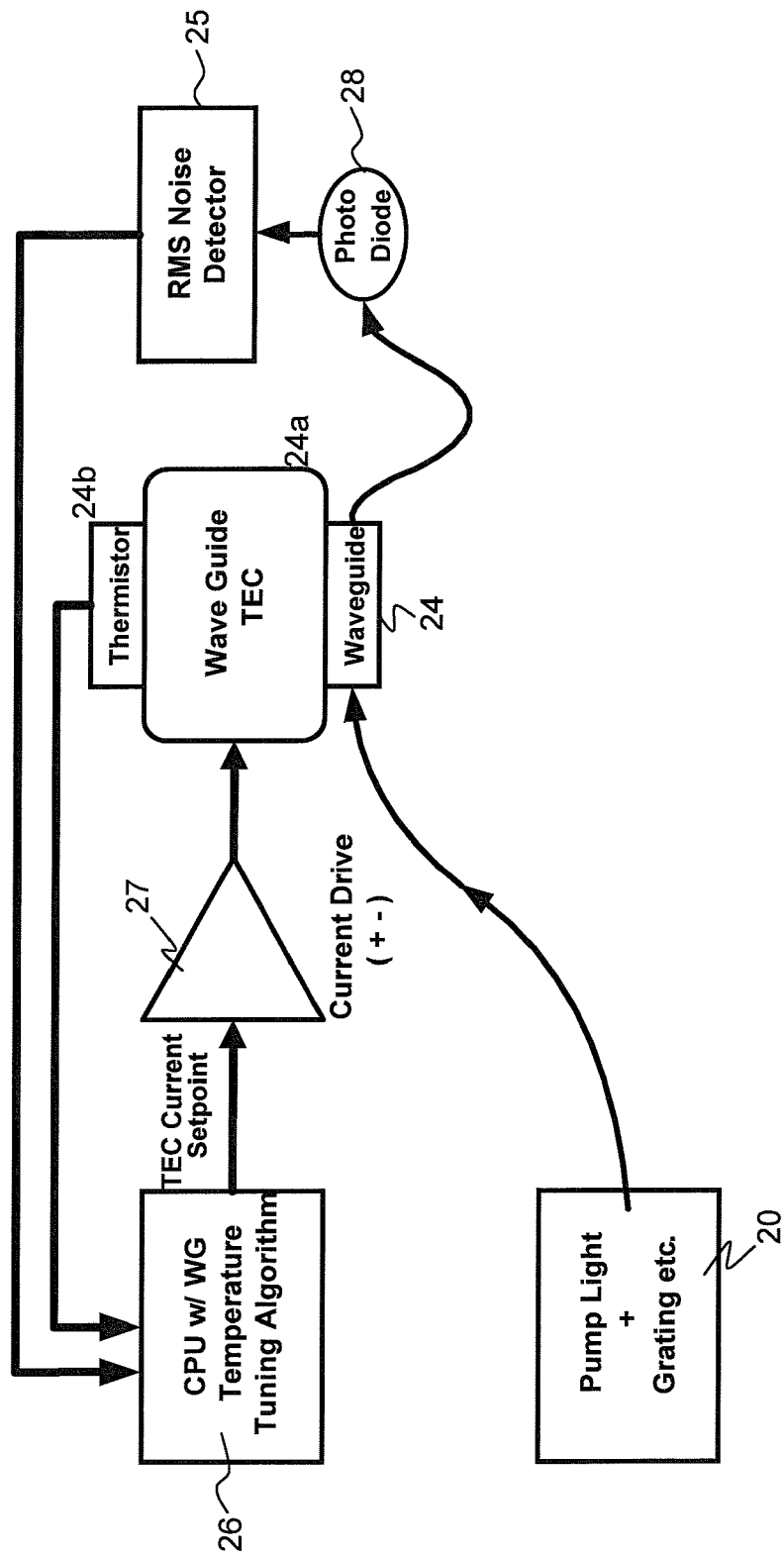
FIG. 2 a diagram showing the waveguide thermoelectric control and noise feedback.

Turning now to FIG. 2 a diagram is shown depicting the waveguide thermoelectric control and noise feedback. Within this specification the term waveguide 24 is used interchangeably with the term frequency doubling crystal 14.

Light that has been generated from the laser unit 20 comprising the laser diode and grating is provided to the waveguide 24 and a portion is intercepted by a photo diode 28 which provides an electrical signal proportional to the power present in the portion of intercepted light to an RMS noise detector. An RMS noise value which is not a true value but is a relative value of RMS noise present in the portion of intercepted light is provided to block 26 including a CPU suitably programmed with a waveguide temperature tuning algorithm for tuning the waveguide 24 which converts the laser signal to a shorter wavelength. A thermistor 24b coupled to the waveguide thermoelectric cooler (TEC) 24a provides temperature information to the CPU via block 26. In dependence upon information received from the thermistor 24b and the RMS noise detector 25, the processor executing the temperature tuning algorithm provides a digital signal to a driver 27 which increases or decreases the current which drives the TEC 24a incrementing or decrementing the temperature accordingly.

Figure 3:
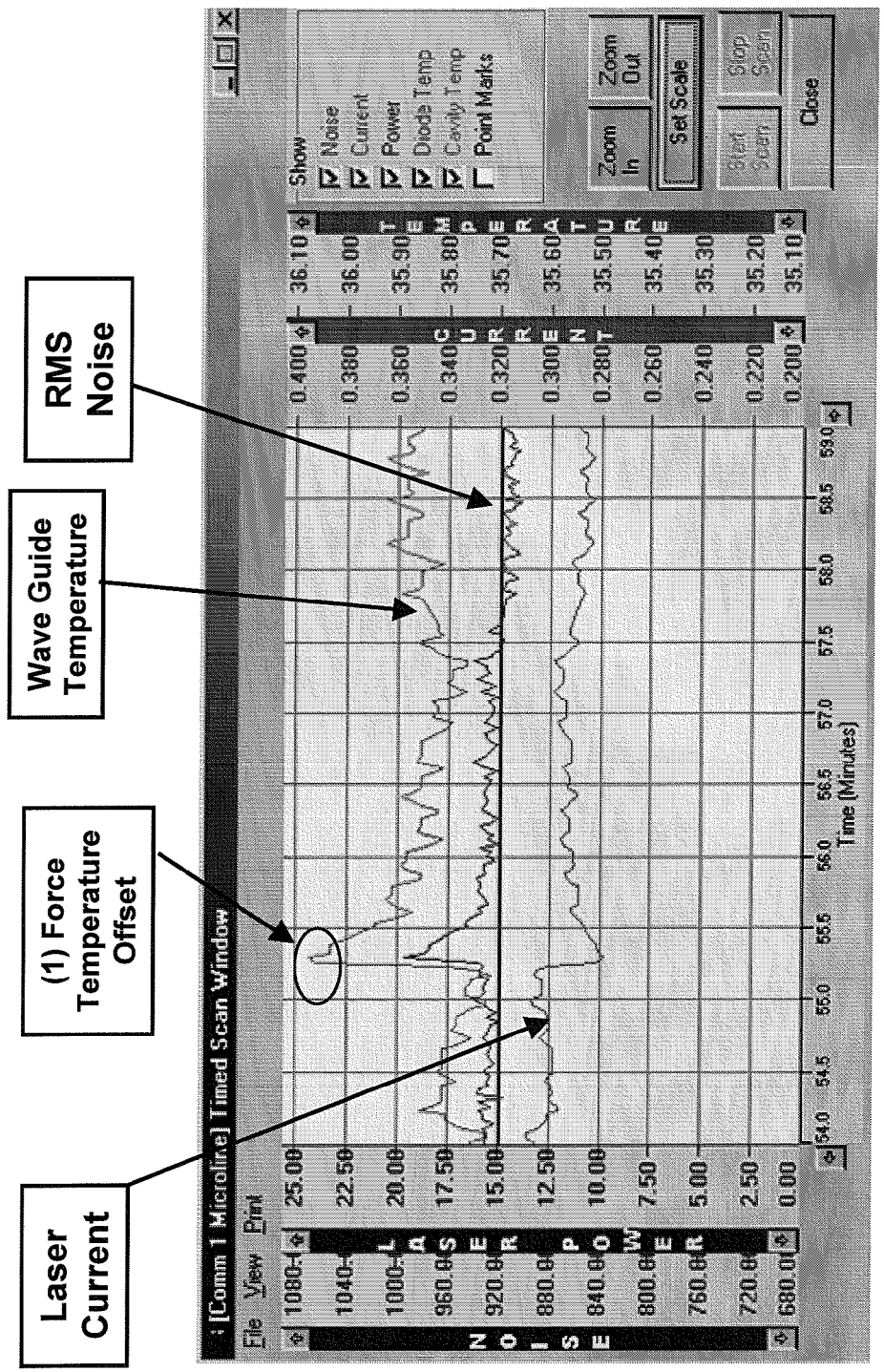
FIG. 3 is a graph of laser power and noise, separately plotted along a same axis, versus time.

FIG. 3 is a graph of laser power and noise separately plotted versus time. The curves illustrate the noise minimizing algorithm recovering from a forced offset (1) onto the optimum waveguide temperature. Note the increase in noise on the graph labeled RMS nose. The waveguide temperature is re-optimized by the dithering algorithm that controls the waveguide or crystal temperature until a new noise level is reached.

Figure 4:
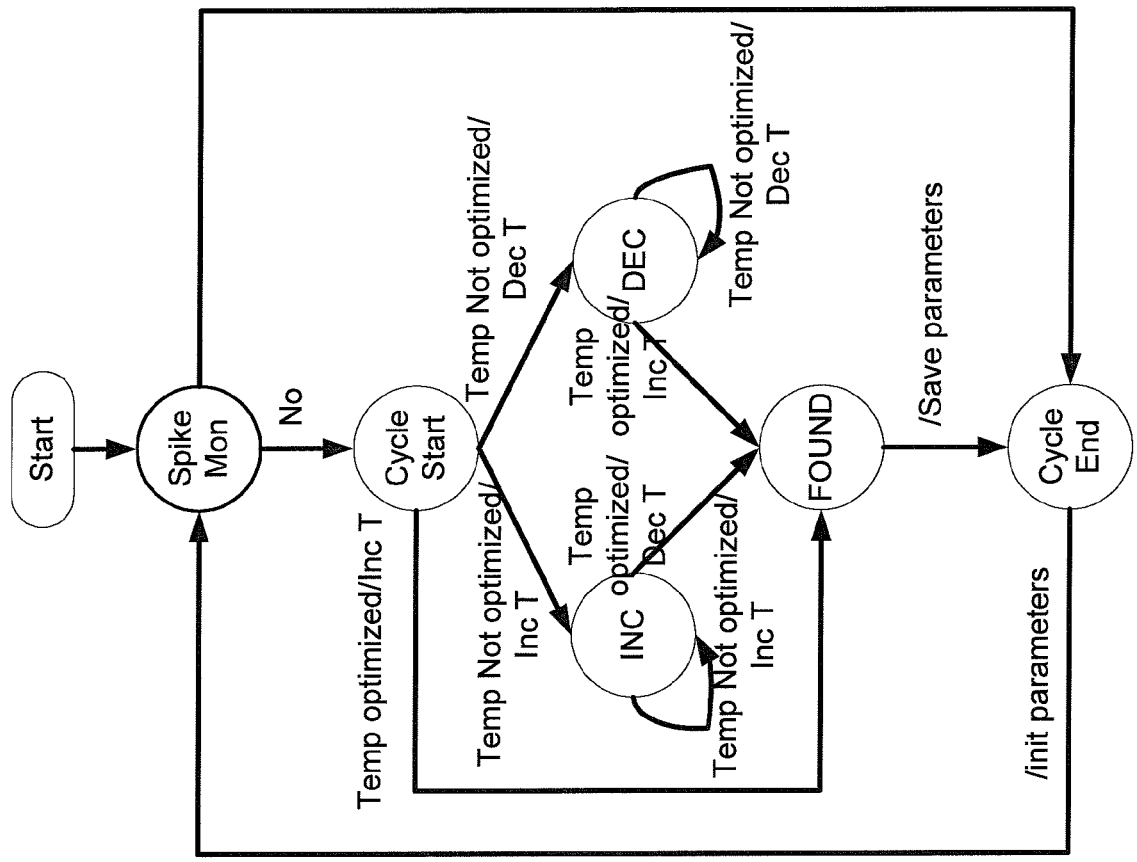
FIG. 4 is a finite state machine (FSM) diagram depicting the operation of the feedback circuit for optimizing by minimizing or lessening RMS noise in the frequency doubled output signal.

FIG. 4 is a flow chart in the form of a finite state machine (FSM), which illustrates the possible execution states: Spike Monitor, Cycle Start, Temperature Increase, Temp Decrease and Found, wherein the particular action is performed to change from one state to another. A circle represents states and an arrow represents a transition. By way of example, in the decrement (DEC) state, it keeps decreasing temp until an optimized temperature is found, then it reverts back by one step and the FSM changes to the FOUND state.

Figure 5:
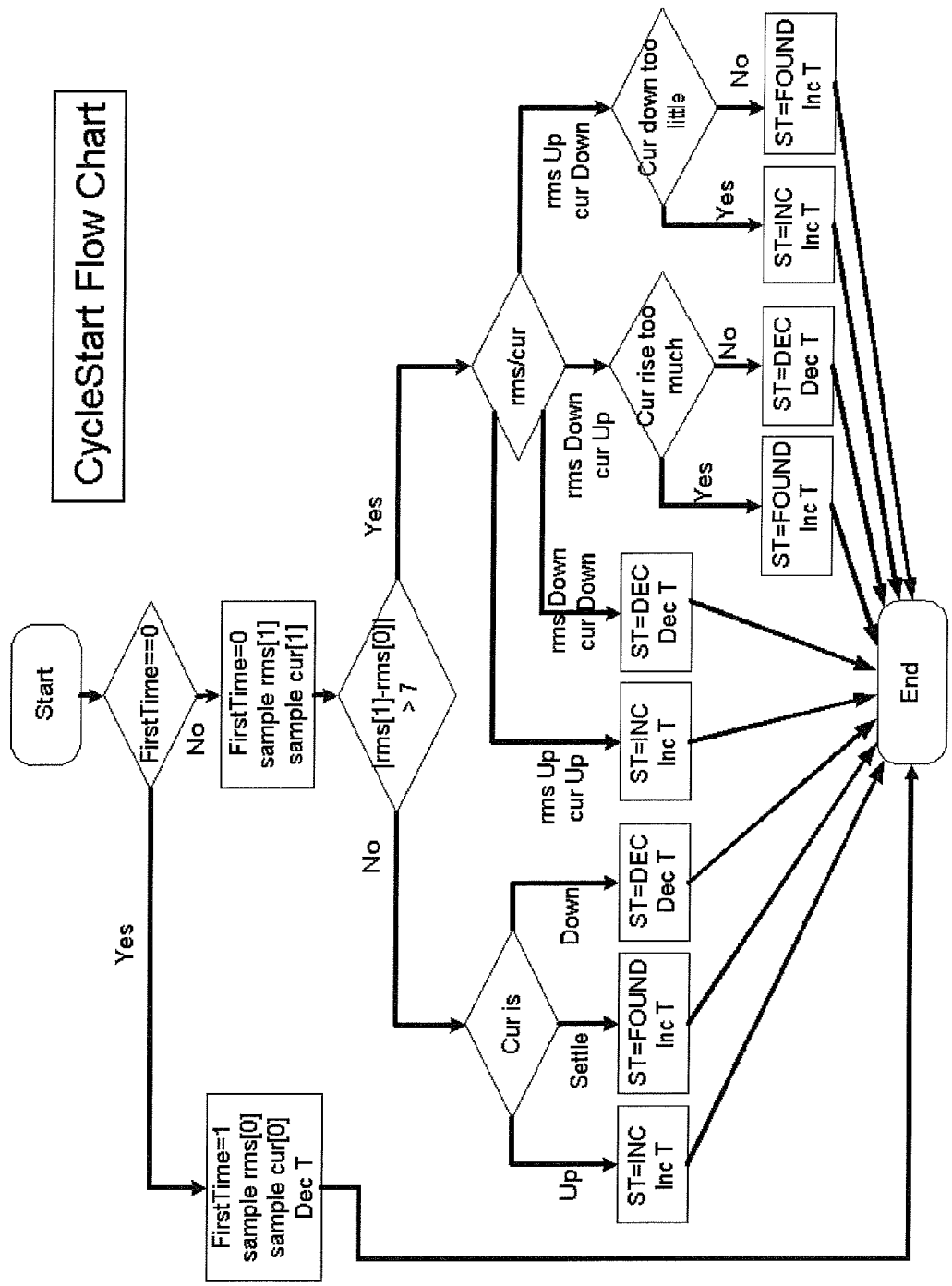
FIG. 5 is a finite state machine (FSM) diagram illustrating the start-up cycle of the circuit in accordance with this invention for temperature tuning the frequency converting crystal.
Figure 6:
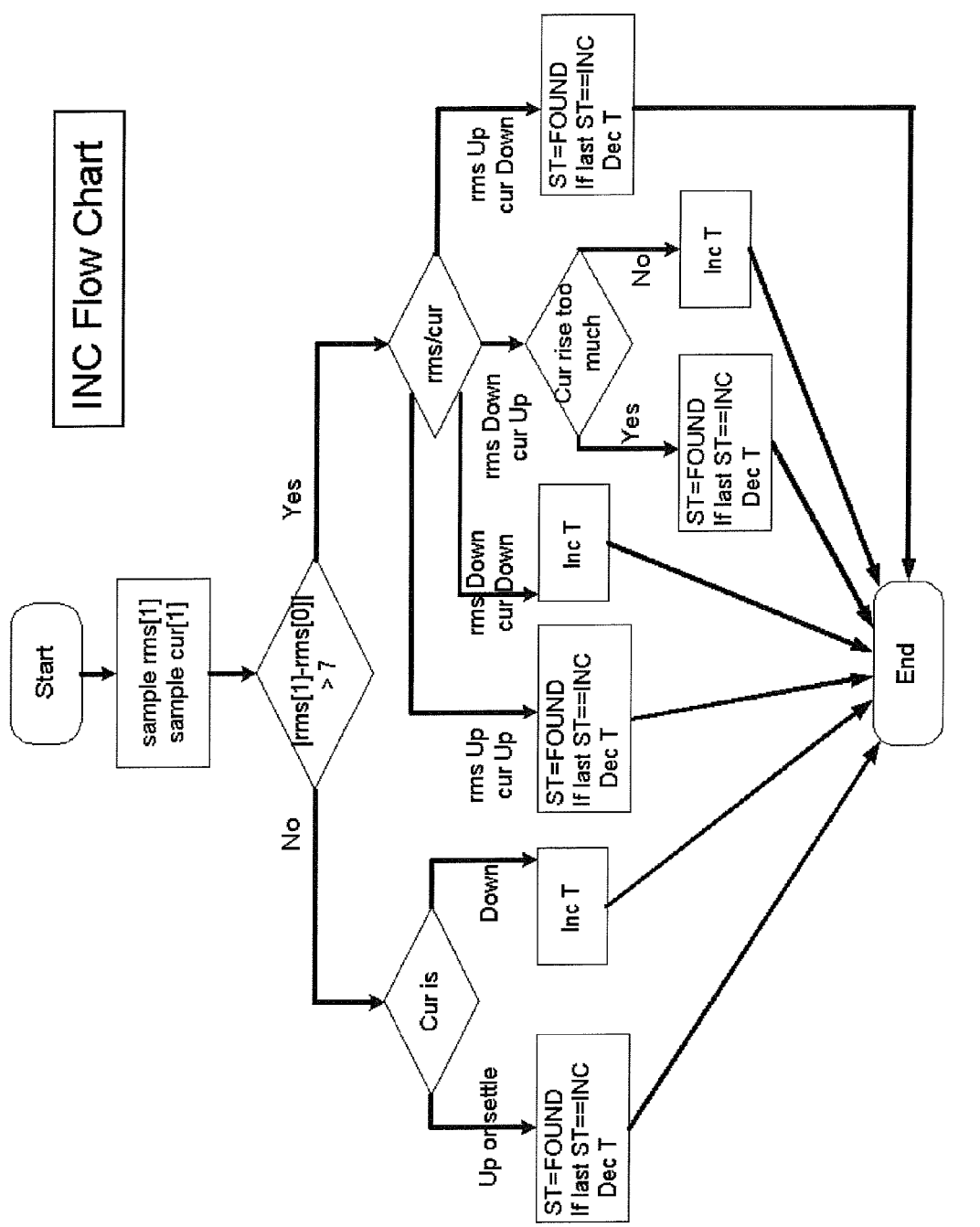
FIGS. 6 and 7 are diagrams of a FSM for incrementing and decrementing so as to increase or decrease temperature in dependence upon conditions indicated within the diagrams.
Figure 7:
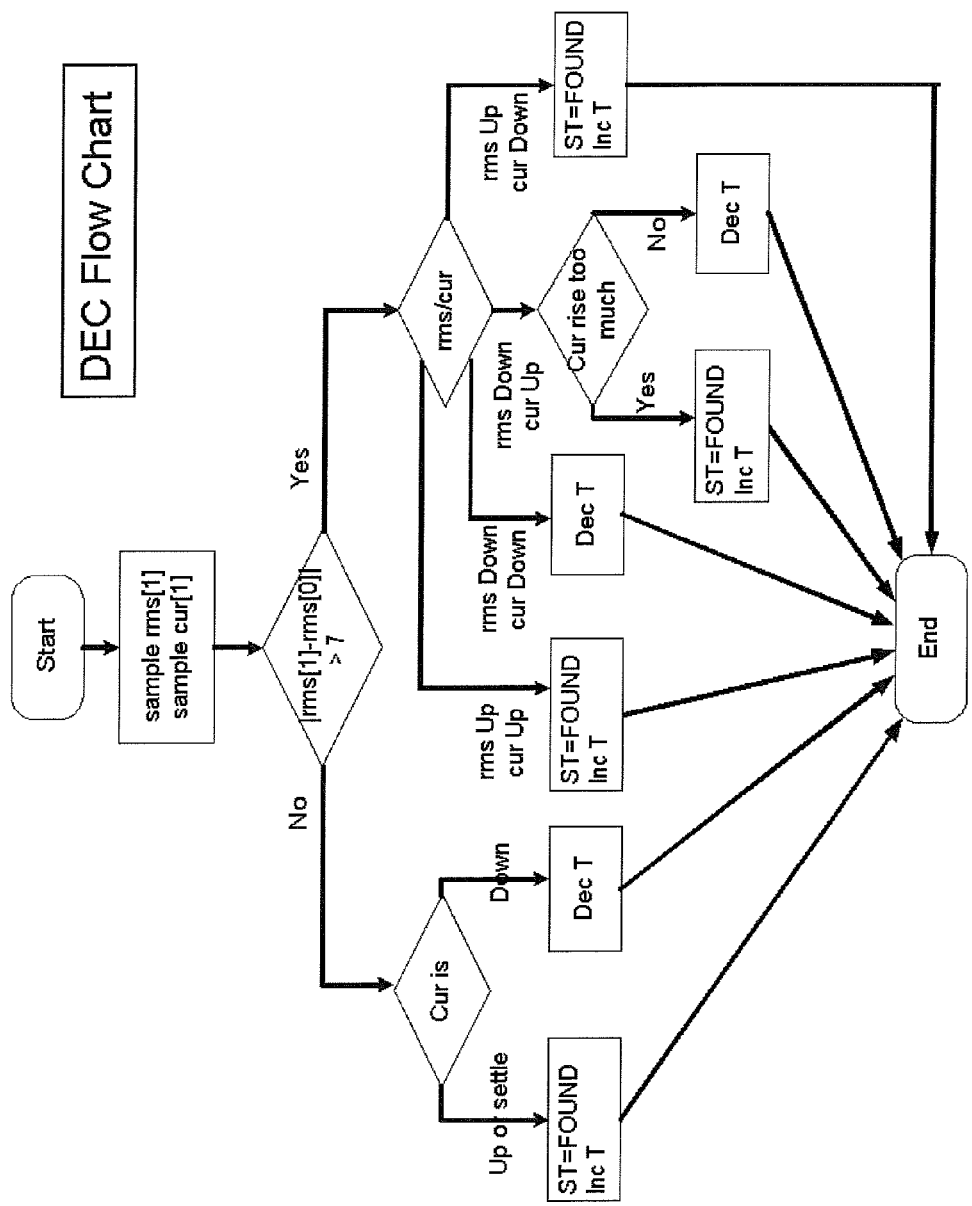

The next three figures, FIGS. 5 through 7 are simple data flow diagrams which describe how the firmware code is implemented for the three major States.

Cycle Start: This is the initial State to sample the noise and current with three temperature setpoints: current temp, decreased temp and increased temp. Then it determines the direction for temperature changes. It could happen that the temperature is already optimized, but most likely it requires incrementing or decrementing leading to INC or DEC state.

DEC State: This is the state that is executed when it is determined decreasing the temperature will have lower noise and lower current; therefore the algorithm decreases the temperature until there is a rise in the relative noise and/or current. There is some decision making within the algorithm to balance the noise and current.

The INC State is the opposite of the DEC state where incrementing occurs as the noise is lessened and then when the noise increases beyond a predetermined limit the DEC state occurs.

Advantageously, the adaptive control algorithm in accordance with this invention is used to control the waveguide temperature based on the current and noise detector. The algorithm will adjust itself when the laser ages, room temperature change, waveguide ages, because it keeps trying to dither the temperature to find out the optimized temperature that will produce the least noise, instead of using calibrated temperature set-point or adjusted by temperature compensation.

What is claimed is:

1. A circuit for generating a low noise short wavelength optical signal, comprising:
   a laser for providing a first optical signal having a first wavelength longer than a second wavelength of the short wavelength signal;
   a frequency converting element positioned to receive the first optical signal from the laser and for converting the first optical signal into the short wavelength signal;
   a feedback circuit for detecting a portion of the short wavelength signal, for determining a level of noise in the detected portion of the short wavelength signal, and for adjusting temperature of the frequency converting element upward one or more temperature increments and downward one or more temperature increments continuously so as to lessen noise in the short wavelength signal, wherein said adjustments upward and downward in temperature are based on a current determined level of noise in the detected portion of the short wavelength signal; and
   a control circuit for maintaining the power level of the short wavelength signal to be at a constant value while the feedback circuit lessens noise in the short wavelength signal.

2. The circuit for generating a low noise short wavelength signal as defined in claim 1, wherein the feedback circuit is configured such that a pre-calibrated temperature set-point for the frequency converting element is not required.

3. The circuit for generating a low noise short wavelength signal as defined in claim 1, wherein the short wavelength signal is a second harmonic signal, and wherein the frequency converting element is a frequency doubling crystal for doubling a frequency of the first optical signal.

4. The circuit for generating a low noise short wavelength signal as defined in claim 1, wherein the laser is a diode laser.

5. The circuit for generating a low noise short wavelength signal as defined in claim 4, wherein the control circuit comprises a controller for providing a supply current to the diode laser, wherein the power level of the short wavelength signal is maintained by adjusting the supply current.

6. The circuit for generating a low noise short wavelength signal as defined in claim 4, wherein the diode laser has an external fiber Bragg grating for stabilizing the first wavelength.

7. The circuit for generating a low noise short wavelength signal as defined in claim 1, wherein the laser is a diode pumped solid state laser.

8. The circuit for generating a low noise short wavelength signal as defined in claim 7, wherein the frequency converting element is disposed outside of the diode pumped solid state laser.

9. The circuit for generating a low noise short wavelength signal as defined in claim 1, wherein the feedback circuit is configured for adjusting temperature of the frequency converting element upward one or more temperature increments and downward one or more temperature increments continuously so as to lessen noise in the short wavelength signal upon start-up of the circuit.

10. The circuit for generating a low noise short wavelength signal as defined in claim 1, wherein the control circuit is configured to operate independently from the feedback circuit.

11. A method for generating a low noise short wavelength optical signal, comprising:
   (a) providing a first optical signal having a first wavelength longer than a second wavelength of the short wavelength signal;

(b) converting the first optical signal into the short wavelength signal using a frequency converting element;

(c) detecting a portion of the short wavelength signal;

(d) determining a level of noise in the detected portion of the short wavelength signal; and (e) while performing steps (c) and (d), adjusting temperature of the frequency converting element upward one or more temperature increments and downward one or more temperature increments continuously, so as to lessen noise in the short wavelength signal, wherein said adjustments upward and downward in temperature are based on the level of noise determined in step (d), wherein in steps (c) to (e), the power level of the short wavelength signal is maintained at a constant value.

12. The method as defined in claim 11, wherein the temperature is varied in a same direction, upward, or downward in dependence upon the level of noise determined in step (d).

13. The method as defined in claim 11, wherein the temperature is varied in an opposite direction from upward to downward, or from downward to upward if the noise level determined in step (d) has increased from a last recorded value.

14. The method as defined in claim 11, wherein step (e) is performed in such a manner that a pre-calibrated temperature set-point for the frequency converting element is not required.

15. The method as defined in claim 11, wherein steps (a) to (e) are performed substantially in real time.

16. Using the method of claim 11 to reduce an increase of noise in the short wavelength optical signal due to aging of the frequency converting element.

17. Using the method of claim 11 to reduce an increase of noise in the short wavelength optical signal due to aging of a source of the first optical signal.

* * * * *